United States Patent
Phua et al.

(10) Patent No.: US 6,807,200 B2
(45) Date of Patent: Oct. 19, 2004

(54) APPARATUS FOR GENERATING LASER RADIATION

(75) Inventors: Poh Boon Phua, Cambridge, MA (US); Kin Seng Lai, Singapore (SG); Rui Fen Wu, Singapore (SG); Yuan Liang Lim, Singapore (SG); Wei Pin Ernest Lau, Singapore (SG)

(73) Assignee: DSO National Laboratories, Singapore (SG)

( * ) Notice: Subject to any disclaimer, the term of this patent is extended or adjusted under 35 U.S.C. 154(b) by 81 days.

(21) Appl. No.: 09/963,181

(22) Filed: Sep. 25, 2001

(65) Prior Publication Data

US 2003/0058903 A1 Mar. 27, 2003

(51) Int. Cl.$^7$ .............................. H01S 3/10; H01F 1/35
(52) U.S. Cl. ........................... 372/21; 372/70; 359/326; 359/330
(58) Field of Search ................................ 359/326, 330; 372/21, 22, 70, 10

(56) References Cited

U.S. PATENT DOCUMENTS

| | | | | |
|---|---|---|---|---|
| 5,047,668 A | * | 9/1991 | Bosenberg | 359/330 |
| 5,136,597 A | * | 8/1992 | Nightingale | 372/21 |
| 5,441,803 A | | 8/1995 | Meissner | |
| 5,657,119 A | * | 8/1997 | Kawasaki et al. | 356/300 |
| 5,663,973 A | * | 9/1997 | Stamm et al. | 372/20 |
| 6,130,900 A | * | 10/2000 | Black et al. | 372/25 |
| 6,544,330 B2 | * | 4/2003 | Ebbers | 117/2 |
| 2002/0149836 A1 | * | 10/2002 | Jovanovic et al. | 359/328 |

OTHER PUBLICATIONS

U.S. patent application No. 09/845,945 "A Tm:Yag LAser" filed Apr. 30, 2001; 17 pages.
Cheung et al; "High Power Conversion to Mid–IR Using KTP and ZGP OPOs" WCI–2 p358–361 circa Jan. 1995.
Phua et al; "Coupled Tandem Optical Parametric Oscillator (OPO): an OPO within an OPO"; OPtics Letters V 23 No. 16 3 pages Aug. 1998.
Phua et al; "High–Efficiency mid–infrared ZnGeP2 Optical Parametric Oscillator in a Multimode–pumped Tandem Optical Parametric Oscillator" App'd Optics Jan. 1999 3 pages.
Phua et al; "Multiwatt high–repetition–rate 2–um output from an intracavity KTiP04 optical parametric oscillator" Applied Optics; V39 No 9, Mar. 2000.
Wu Intracavity KTP OP within a thermal bifocussing and birefringence compensated Nd:YAG laser cavity; Optical Society; Jan. 1999 3 pp.
Bosenberg; "High Efficiency and narrow–linewidth operation of a two–crystal B–BaB2O4 optic parametric oscillator" Appl. Phys. Lett. Nov. 1989.
Smith et al "Increased acceptance bandwidths in optical frequency conversion by use of multiple walk–off–compensating nonlinear crystals" J. Opt. Soc. Am. V 15 No 1 Jan. 1998 20pp.
Armstrong; "Parametric amplification and oscillation with walkoff–compensating crystals" J. Opt. Soc. Am. V 14 No 2 Feb. 1997 15pp.
Zondy et al "Twin–crystal walk off–compensating type–II second–harmonic generation: single–pass and cavity–enhanced experiments in KTiOPO4" J. Opt. Soc. Am. Feb. 1999 11 pages.
Feve; "Optimized blue light generation in optically walk–off compensated RbTiAsO4 &KTiOPAsO4" Optics Communications Jan. 1999 11 pages.
Wu Linearly Polarized 120–W Output from a Diode–Pumped Nd:YALO Laser; Procdgs. of SPEI V 3929 Jan. 2000 8 pages.

* cited by examiner

Primary Examiner—Don Wong
Assistant Examiner—James Menefee
(74) Attorney, Agent, or Firm—Ipsolon LLP

(57) ABSTRACT

An apparatus for generating laser radiation, the apparatus comprising: a pumping device comprising a resonant cavity; and a laser radiation generation element that is substantially Poynting vector walk-off compensated, the laser radiation generation element being located within the resonant cavity.

11 Claims, 1 Drawing Sheet

APPARATUS FOR GENERATING LASER RADIATION

Figure 1:
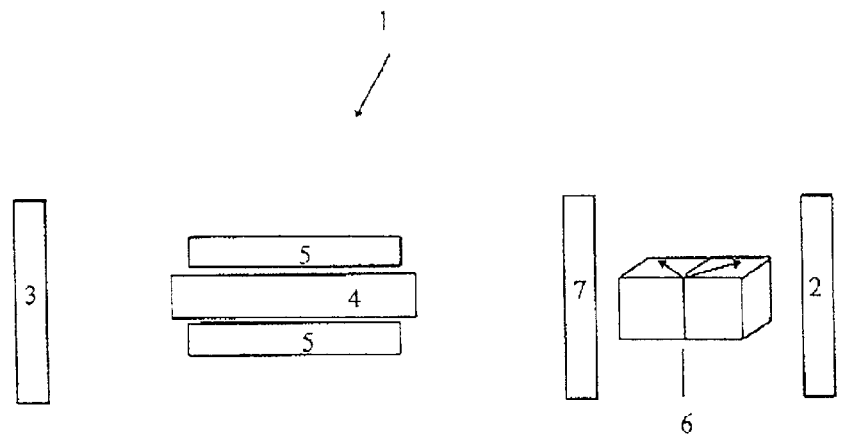

THIS INVENTION relates to a device for generating laser radiation, and in particular to a device employing an intra-cavity optical parametric oscillator to generate the laser radiation.

An optical parametric oscillator (OPO) is a device which pumps a non-linear material with a laser to produce a coherent beam of light that can be tuned over a wide range of wavelengths, and OPO's are useful for generating laser radiation in, for example, the mid-infrared spectral range, which radiation has many applications. Radiation in the 1 $\mu$m range is suitable for pumping many types of OPO, and it has recently been proposed to pump an OPO by placing the OPO inside the resonant cavity of a Q-switched 1 $\mu$m Nd:YAG laser.

However, a difficulty that is encountered when attempting to generate pumping radiation above around 10 W using such a configuration is the presence of a thermally-induced birefringence effect in the Nd:YAG laser, which hampers the generation of high-power polarised pumping radiation within the resonant cavity of the pumping laser. Thermal birefringence occurs when anisotropic thermal stress in a laser sample causes a de-polarisation of an input polarised beam, resulting in a loss in output power and a reduction in output beam quality. Optical compensation for these thermal birefringence effects is conventionally a difficult task, requiring the provision of a complex cavity with several intra-cavity optical elements. Clearly, such an arrangement is disadvantageous because of the high cost and additional time and care required to construct the complex cavity, and the provision of a large number of optical elements increases the possibility that one or more of the elements will fail or become mis-aligned.

It is an object of the present invention to seek to provide a laser radiation generation device that alleviates some of the above problems.

Accordingly, one aspect of the present invention provides an apparatus for generating laser radiation, the apparatus comprising: a pumping device comprising a resonant cavity; and a laser radiation generation element that is substantially Poynting vector walk-off compensated, the laser radiation generation element being located within the resonant cavity.

Advantageously, the pumping device is operable to produce substantially linearly polarised pumping radiation.

Preferably, standing waves within the resonant cavity converted by the laser radiation generation element to generate laser radiation having a different wavelength to that of the standing waves.

Conveniently, the pumping device further comprises a sample of laser material.

Advantageously, the laser material is a naturally birefringent laser material.

Preferably, the laser material is substantially Nd:YALO, Nd:YVO$_4$ or Nd:YLF.

Conveniently, the laser material is substantially optically isotropic.

Advantageously, the laser material is substantially Nd:YAG.

Preferably, the apparatus further comprises a source of pumping radiation to pump the laser material.

Conveniently, the source of pumping radiation comprises at least one array of diodes.

Advantageously, the source of pumping radiation comprises at least one lamp.

Preferably, the resonant cavity is defined by a first pair of elements which are substantially reflective to radiation produced by the pumping device.

Conveniently, the laser radiation generation element comprises an optical parametric oscillator Advantageously, the optical parametric oscillator is a $\beta$-BaB$_2$O$_4$, LiB$_3$O$_5$, KTiOPO$_4$ or LiNbO$_3$ optical parametric oscillator.

Preferably, the laser generation element comprises a second harmonic generation device.

Conveniently, the laser radiation generation element is a non-critical phase-matched KTiOPO$_4$, KTiOAsO$_4$ or RbTiOAsO$_4$ device.

Advantageously, the laser radiation generation element is provided between a second pair of reflective elements which are substantially reflective to laser radiation generated by the laser radiation generation element.

Preferably, an internal further laser radiation generation element is provided within the second pair of reflective elements.

Conveniently, the laser radiation generation element comprises a pair of crystals.

Advantageously, the crystals are bonded to one another.

Preferably, the crystals are diffusion bonded to one another.

Conveniently, an external further laser radiation generation element is provided outside the resonant cavity of the pumping device.

Advantageously, the pumping device comprises a Q-switching element.

Another aspect of the present invention provides an apparatus for generating laser radiation, the apparatus comprising: a pumping device comprising a Nd:YALO laser having a resonant cavity; and an optical parametric oscillator that is substantially Poynting vector walk-off compensated, the optical parametric oscillator being located within the resonant cavity.

A further aspect of the present invention provides an apparatus for generating laser radiation, the apparatus comprising: a pumping device comprising a resonant cavity and being operable to produce substantially linearly polarised radiation within the resonant cavity; and a laser radiation generation element that is substantially Poynting vector walk-off compensated, the laser radiation generation element being located within the resonant cavity.

Figure 2:
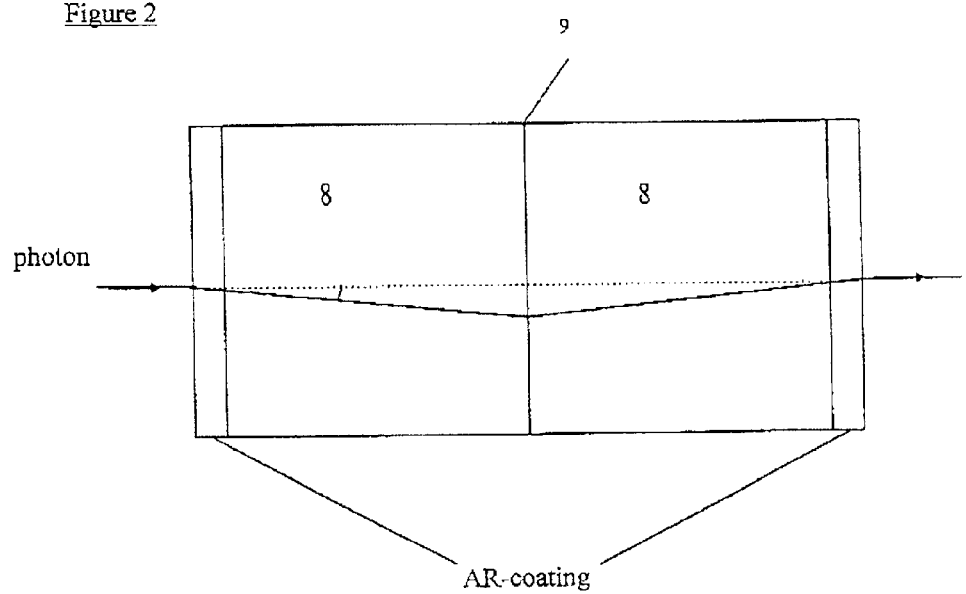

In order that the present invention may be more readily understood, embodiments thereof will now be described, by way of example, with reference to the accompanying drawings, in which:

FIG. 1 shows a laser radiation generation device embodying the present invention; and FIG. 2 shows a pair of crystals bonded together in a Poynting Vector walk-off compensated configuration, suitable for use with the device of FIG. 1.

Turning firstly to FIG. 1, a laser radiation generation device 1 embodying the present invention is shown. The laser radiation generation device 1 comprises first and second substantially planar mirrors 2, 3, which are arranged so as to oppose one another. Between the first and second mirrors 2, 3, an elongate sample 4 of neodymium-doped yttrium aluminate (Nd:YALO) is provided, the longitudinal axis of the sample 4 being substantially perpendicular to the opposed reflective surfaces of the first and second mirrors 2, 3. Preferably, the sample 4 of Nd:YALO has a diameter of approximately 4 mm, and a length of around 97 mm. However, the sample 4 of Nd:YALO need not be elongate, and may be of any suitable shape. Indeed, the sample 4 need not be composed of Nd:YALO, and may comprise any suitable laser material, for example neodymium-doped yttrium lithium fluoride (Nd:YLF), Neodymium-doped yttrium vandate ($YVO_4$) or neodymium-doped yttrium aluminium garnet (Nd:YAG).

A plurality of diode arrays 5 are provided adjacent the sample 4 of Nd:YALO, positioned such that radiation produced by the diodes in the arrays 5 is directed towards the sample 4. Preferably, five diode arrays 5 are provided, but a skilled person will appreciate that any suitable number of diode arrays 5 may be provided. In operation of the device 1, radiation produced by the diode arrays 5 is absorbed by the sample 4 of Nd:YALO, causing the sample 4 of Nd:YALO to emit coherent radiation having a wavelength of around 1 μm substantially along the length thereof. The first and second mirrors 2, 3 are substantially reflective to radiation in the 1 μm wavelength ranges and due to the presence of the first and second mirrors 2, 3, radiation leaving the sample 4 of Nd:YALO through the ends thereof will be reflected back into the sample 4.

A skilled person will realise that the above-described arrangement will lead to the formation of standing waves of coherent radiation between the first and second mirrors 2, 3, and that a first resonant cavity will be created therebetween. Preferably, the first resonant cavity is approximately 33 cm in length. The reflectivity of the second mirror 3 to radiation in the 1 μm wavelength range is preferably greater than 99.5%, and the reflectivity of the first mirror 2 to such radiation is preferably around 95%. Hence, it will be understood that a portion of the radiation produced within the first resonant cavity will escape through the first mirror 2, forming an output laser beam having a wavelength of around 1 μm.

Although the present embodiment is described having diode arrays 5 to provide pumping radiation for the Nd:YALO laser, a skilled person will appreciate that any suitable method of pumping the Nd:YALO laser may be used. For instance, one or more lamps may be used to provide pumping radiation for the Nd:YALO laser, instead of the diode arrays 5. Also, standing waves of radiation having a wavelength of around 1 μm are given purely as an example, and any suitable wavelength of radiation may be produced in the first resonant cavity.

The Nd:YALO laser may be Q-switched using any suitable switching means, such as one or more Kerr cells or Pockels cells. A skilled person will appreciate how such switching may be achieved, and understand the circumstances under which Q-switching may be necessary to allow a sufficiently large population inversion to build up in the Nd:YALO sample 4 before allowing the formation of a laser pulse.

The standing waves of radiation produced within the first resonant cavity are themselves employed as pumping radiation, as will be understood from the subsequent description. A laser radiation generation element 6 is located within the first resonant cavity, such that the standing waves of pumping radiation pass through the laser radiation generation element 6.

The laser radiation generation element 6 is preferably an OPO which, as described above, is operable to produce a tunable beam of coherent light when pumped by a laser. As will be appreciated from the above, the laser radiation within the first resonant cavity may be used to pump the laser radiation generation element 6, thereby causing the laser radiation generation element 6 to generate such tunable radiation.

YALO is an example of a naturally birefringent laser material. Such materials are optically anisotropic, and produce birefringence in laser radiation passing through the material along a path other than the optical axis of the material. This property allows one to select crystallographic orientations of the laser material which optimise particular performance characteristics, for instance linear polarisation of a laser beam. Other naturally birefringent laser materials include $YVO_4$ and YLF.

In the present case, linearly polarised laser radiation is particularly suitable for pumping an OPO to produce a tunable output laser beam, and advantageous embodiments of the present invention employ a naturally birefringent laser material to produce the laser radiation to pump the laser generation element 6. However, while natural birefringence has advantageous properties, it can also have the effect of reducing the power of the pumping radiation.

As discussed above, thermally-induced birefringence can also reduce the efficiency of the pumping laser, and such thermally-induced birefringence is most prominent in isotropic laser materials, such as YAG. Such isotropic laser materials may also be employed with the present invention.

In either case, whether birefringence occurs in the sample 4 of the laser material by natural birefringence thereof or due to thermal effects, this birefrigence is likely to reduce the beam quality of the pumping radiation produced by the sample 4.

The Poynting vector is a vector whose magnitude is proportional to the power per unit area present at a given point in an electromagnetic field, and whose direction indicates the direction of energy flow in the field. In the phenomenon of Poynting vector walk-off at an interface, the direction of the Poynting vector is mostly in the direction of phase propagation, but has a small transverse component parallel to the interface. A material that is Poynting vector walk-off compensated is formed so that the transverse component of the Poynting vector is substantially eliminated, so that the Poynting vector is directed substantially entirely in the direction of phase propagation, thereby reducing or eliminating the power dissipation from the field arising from Poynting vector walk-off.

In a preferred embodiment of the present invention, the Poynting vector walk-off compensated laser radiation generation element 6 is formed from a pair of crystals, which are bonded together in a walk-off compensated configuration. Advantageously, the crystals are Type II, 51° cut, and formed from potassium titanyl phosphate (KTP), although many other types of crystal, such as $ZnGeP_2$, may be used. A skilled person will readily appreciate which types of crystal are suitable for use with the present invention.

Preferably the crystals are diffusion-bonded to one another, to ensure that the crystals retain their walk-off compensated alignment. In an advantageous embodiment of the present invention, the laser radiation generation element 6 is formed from a single crystal block, to ensure identical crystallographic orientation for the two crystals. In this embodiment, the single crystal is correctly oriented and polished, and then cut into two crystals, which are preferably of around 5 mm*5 mm*10 mm in size. The resulting two crystals are optically contacted in a walk-off compensated configuration in a clean atmosphere (e.g. a horizontal clean bench). The aligned crystals are then subjected to thermal processing at high temperature for several hours to ensure that a permanent bond forms between the crystals. The entrance and exit surfaces of the crystals are then anti-reflection coated for radiation of around 1 μm wavelength, as well as for radiation of the type that it is desired to produce from the laser radiation generation element 6. Finally, the crystals are mounted on a heat sink, which is preferably water-cooled, and provided with contacts (which may be formed, for example, from iridium).

FIG. 2 shows a pair of crystals 8 which have been bonded to one another as described above. The central line 9 along which diffusion bonding has occurred is shown, as well as the path of a photon through the crystals 8 from left to right. It will be appreciated that the walk-off in the photon path arising from the entry of the photon into the left-hand crystal 8 is compensated for at the junction 9 of the crystals 8, and the overall effect is as if the photon had passed undeflected through the crystals 8.

The laser radiation generation element 6 is positioned within the first resonant cavity, close to the first mirror 2. A third mirror 7 is positioned between the laser radiation generation element 6 and the sample 4 of Nd:YALO, the third mirror 7 being substantially transmissive to radiation produced by the Nd:YALO sample 4. Hence, the third mirror 7 does not hamper the formation of the standing waves of radiation having a wavelength of 1 $\mu$m within the first resonant cavity. However, the third mirror 7 is substantially reflective to radiation of the wavelength that it is desired to produce by the laser radiation generation element 6. In addition, the first mirror 2 is substantially reflective (although less so than the third mirror 7) to such radiation. Hence, it will be understood that, when the laser radiation generation element 6 generates radiation, the presence of the first and third mirrors 2, 7 between which the laser radiation generation element 6 is located leads to the formation of a second resonant cavity, in which standing waves of the radiation produced by the laser radiation generation element 6 may exist. For example, an OPO of the type described above may generate laser radiation in the 2 $\mu$m wavelength range. Advantageously, the second resonant cavity is approximately 2.5 cm in length.

Preferably, the reflectivities of the first and third mirrors 2, 7 to the radiation produced by the laser radiation generation element 6 are around 75% and around 99% respectively, and it will be understood that this arrangement will lead to the emission of a portion of the radiation from the first mirror 2, which emission comprises the output laser beam from the laser radiation generation element 6. It will be appreciated that the present embodiment produces two laser beams, one comprising a portion of the pumping radiation and the other comprising a portion of the radiation produced by the laser radiation generation element 6.

The provision of a substantially Poynting vector walk-off compensated laser generation element 6 increases conversion efficiency in the laser generation element 6 by providing a longer effective gain length for lower order modes of the pumping radiation, and also by providing an increased acceptance angle, which is beneficial for higher order modes of the pumping radiation. Hence, the provision of a substantially Poynting vector walk-off compensated laser generation element 6 provides valuable compensation for loss of beam quality of the pumping radiation incurred due to birefringence in the sample 4, as described above.

In an advantageous embodiment of the present invention, one or more further laser radiation generation elements may be provided. These may be located outside the first resonant cavity, so that laser radiation produced by the above-described laser radiation generation element 6 passes therethrough and acts as pumping radiation, and such an arrangement is useful for generating laser radiation in the mid infra-red range. Alternatively, the further laser radiation generation element may be located inside the second resonant cavity, in a coupled tandem configuration with the above-described laser radiation generation element 6.

While the laser radiation generation element 6 has been described as an OPO in the above embodiment, the present invention is not limited to this, and any suitable substantially Poynting vector walk-off compensated laser radiation generation element may be used. For instance, a $\beta$-BaB$_2$O$_4$, LiB$_3$O$_5$, KTiOPO$_4$, or LiNbO$_3$ device may be used. In addition, the laser radiation generation element may be a noncritical phase-matching device, such as a KTiOPO$_4$, KTiOAsO$_4$ or RbTiOAsO$_4$ device, or a quasi-phase-matching device such as a periodically-poled LiN$_6$O$_3$ (PPLN), periodically-poled KTP (PPKTP) or periodically-poled RTA (PPRTA) device, in order to generate longer wavelength laser radiation (for instance, for eyesafe lasers). The above-described further laser radiation generation elements may be ZnGeP$_2$, AgGaS$_2$ or AgGaSe$_2$ devices.

It has been found that, using an arrangement such as described above, a few tens of watts of laser output power from the laser radiation generation element can be obtained, and it is believed that this is significantly higher than has been achieved using conventional laser radiation generation apparatuses.

A skilled person will appreciate that the present invention allows the construction of a laser radiation generation apparatus that is compact, simple and high powered, and confers significant advantages over existing laser radiation generation apparatuses.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An apparatus for generating laser radiation tunable over a wide range of wavelengths, the apparatus comprising:

a Q-switched pumping device comprising a sample of laser material located within a first resonant cavity defined by first and second elements which are substantially reflective to radiation produced by the pumping device, the pumping device being operable to produce standing waves of pumping radiation having a wavelength of around 1 $\mu$m within the resonant cavity;

a first laser radiation generation element comprising a diffusion bonded substantially Poynting vector walk-off compensated optical parametric oscillator (OPO), located within the first resonant cavity and further located within a second resonant cavity defined by a third element and one of the first and second elements, and arranged so that standing waves within the first resonant cavity are converted by the laser radiation generation element to generate laser radiation within the second resonant cavity having a different wavelength to that of the pumping radiation; and a further laser radiation generation element arranged in a coupled tandem configuration with the first laser generation element so that radiation generated by the first laser generation element passes through the further laser generation element and acts as pumping radiation therefor, causing the further laser generation element to generate laser radiation in the mid infra-red range.

2. An apparatus according to claim 1, wherein the pumping device is operable to produce substantially linearly polarized pumping radiation.

3. An apparatus according to claim 1, wherein the laser material is a naturally birefringent laser material.

4. An apparatus according to claim 1, wherein the laser material is substantially optically anisotropic Nd:YALO.

5. An apparatus according to claim 1, wherein the laser material is one of substantially optically anisotropic laser materials Nd:YVO$_4$ or Nd:YLF.

6. An apparatus according to claim 1, further comprising a source of pumping radiation to pump the laser material.

7. An apparatus according to claim 6, wherein the source of pumping radiation comprises at least one array of diodes.

8. An apparatus according to claim 6, wherein the source of pumping radiation comprises at least one lamp.

9. An apparatus according to claim 1, wherein the first laser radiation generation element is a non-critical phase-matched device.

10. An apparatus according to claim 1, wherein the first laser radiation generation element comprises a sample of KTiOPO$_4$ (KTP).

11. An apparatus according to claim 1, wherein the second laser radiation generation element comprises a sample of ZnGeP$_2$ (ZGP).

* * * * *